UNITED STATES PATENT OFFICE.

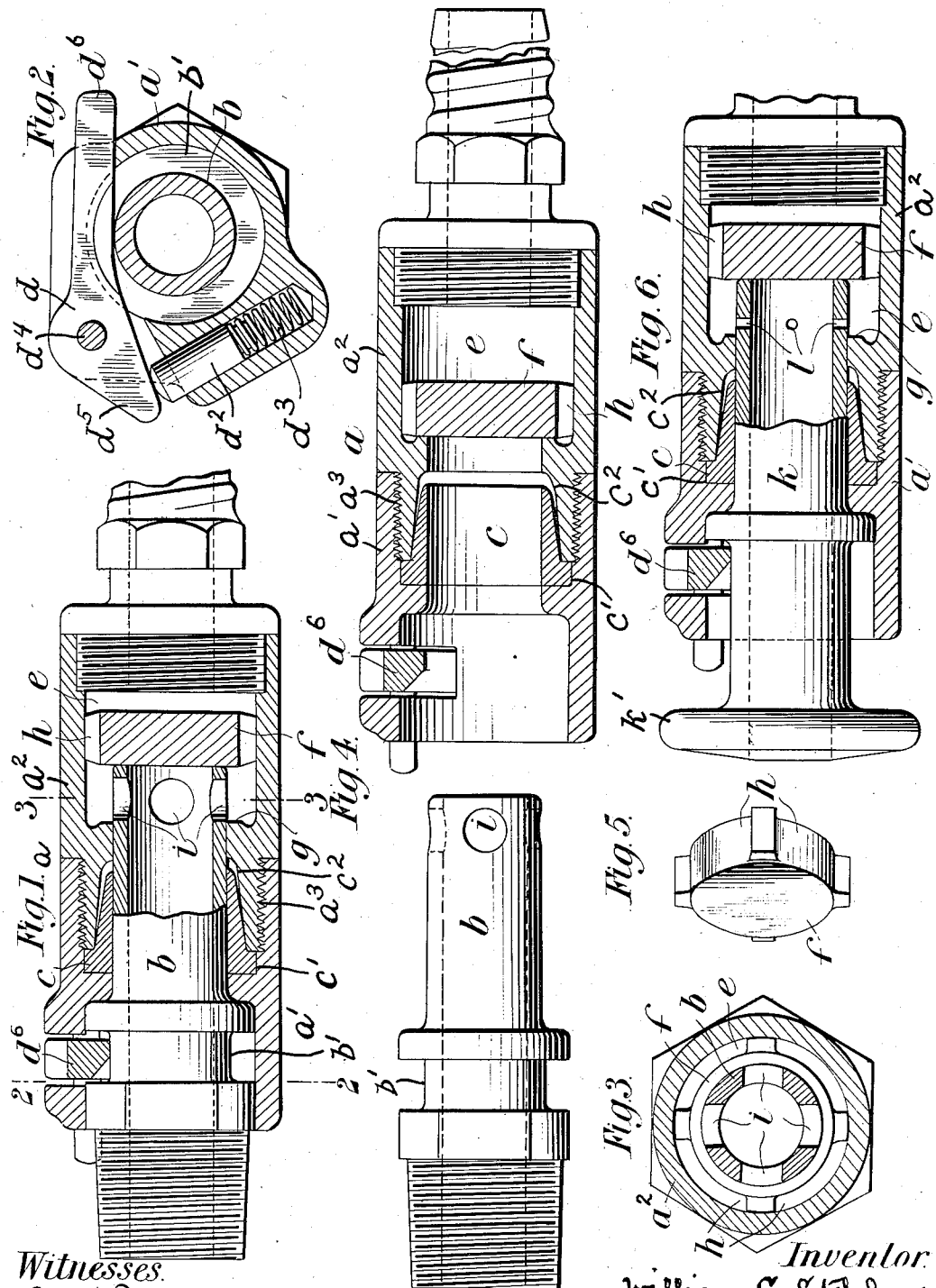

WILLIAM CHARLES STEPHENS, OF CARN BREA, ENGLAND.

HOSE COUPLING OR UNION.

1,092,673.     Specification of Letters Patent.     Patented Apr. 7, 1914.

Application filed October 31, 1913. Serial No. 798,522.

*To all whom it may concern:*

Be it known that I, WILLIAM CHARLES STEPHENS, a subject of the King of Great Britain, residing at the Climax Drill Works, Carn Brea, Cornwall, England, have invented new and useful Improvements in or Connected with Hose Couplers or Unions, of which the following is a specification.

My invention relates to hose couplers or unions of the kind wherein the two members are respectively a spigot and a socket, designed to be inserted one into the other, and wherein a valve is arranged in such a manner that the act of connecting or disconnecting the two members of the coupler shall have the effect of opening or closing the passageway through the coupler.

According to my invention the two members of the coupling are advantageously arranged in the manner described in the specification of my former British Patent No. 28040 of 1911, that is to say, the spigot member of the coupling is formed with a groove with which a spring-trigger on the socket member of the coupling is designed to engage, for preventing the two parts of the coupling from being separated when connected. The socket member of the coupling also is provided with a cup-leather, through which the spigot member is passed and which is held in contact with the spigot member by the fluid pressure behind it.

According to my present invention the socket member of the coupling is provided with a chamber containing a valve designed to slide within the said chamber and to seat upon a seating around the aperture.

The spigot member of the coupling, at the extremity which is designed to project into the valve chamber, is formed with a series of lateral openings, so that when the spigot member is inserted into the socket member and the end of the spigot member comes into contact with the valve and pushes it away from its seat, the fluid will be able to flow around the valve through the lateral holes in the spigot member.

When couplings of the kind in question are used for the conveyance of compressed air for driving rock drills or other machines working in mines or other confined spaces, I provide means whereby, when the coupling members are separated and the drill or machine is not working, a certain amount of air can be allowed to escape through the coupling for the purpose of maintaining the atmosphere in proper condition for breathing; and in order to accomplish this I employ a plug which can be inserted into the socket member of the coupling.

In practice I find it advantageous to make this plug tubular and provide it with an external collar with which the locking lever will engage to retain the plug in the proper position, the said plug having in it a lateral hole or holes, communicating with the central passage, for the escape of the air.

To enable my invention to be fully understood, I will describe the same by reference to the accompanying drawing, in which:—

Figure 1 is a sectional elevation of a coupling having a valve arranged in accordance with my invention, and Figs. 2 and 3 are sections on the line 2—2, and 3—3, respectively of Fig. 1. Fig. 4 is a view similar to Fig. 1, but showing the two parts of the coupling separated. Fig. 5 is a perspective view of the valve separated from the coupling. Fig. 6 is a sectional view showing the arrangement wherein a tubular plug is inserted into the socket end of the coupling in lieu of the ordinary spigot end of the said coupling.

$a$ indicates the socket end of the coupling which is formed of two parts $a'$ and $a^2$ removably secured together at $a^3$. The part $a'$ is provided with a recess $c'$ and the part $a^2$ has a recess $c^2$ in which a cup-leather $c$ is located and said cup-leather is held in place by the parts $a'$ and $a^2$ when said parts are connected.

$b$ is the spigot member of the coupling which is inserted in the socket member and is engaged by the cup-leather $c$ to form a water tight joint. The socket member is provided near one end with a chamber $d'$ in which slides a pin $d^2$, which is pressed outwardly by a coil spring $d^3$. A locking member $d$ is pivotally mounted at $d^4$ upon the socket member and one of its ends $d^5$ is engaged by the pin $d^2$. The spigot member $b$ is provided with an exterior annular groove $b'$ in which the end $d^6$ of the locking member is adapted to be forced by the spring $d^3$ and pin $d^2$ when the two members of the coupling are united.

$e$ is the chamber which, according to my present invention, is provided upon the socket member $a$ of the coupling, and $f$ is a valve of the disk type, shown detached in Fig. 5, which is capable of sliding in the said chamber and which is adapted to seat with one of its faces against a seating $g$ formed around the aperture through which the spigot member $b$ of the coupling is inserted, the said valve being formed with notches or recesses $h$ through which the fluid can flow when the valve is not resting against its seat $f$.

The spigot member $b$ of the coupling is, according to this invention, made longer than the spigot described in my said former specification, so that when it is inserted into the coupling the valve will be pushed away from its seat, as clearly shown in Fig. 1, holes $i, i$ formed around the inner end of the spigot, allowing the liquid which passes through the recesses $h$ in the valve, to flow into the spigot member and through the coupling.

$k$, Fig. 6, indicates the plug which can be inserted into the socket part $a$ of the coupling in lieu of the spigot member $b$. The construction of this plug is practically identical with that of the spigot member $b$, the difference being, that the end of the plug which projects outside the socket is formed as a handle $k'$, and is not formed for the attachment of the hose; and that instead of forming holes $i, i$ which are capable of taking the full volume of air which is to flow through the coupling, a series of small holes $l, l$ is provided which will allow a small quantity of air to escape, the quantity depending upon the size of the holes.

Instead of employing a disk valve any other suitable form of valve may be used.

I claim:

A coupling comprising a socket member and a plug member, said socket member being formed of two separable parts having annular recesses, a cup-leather adapted to fit in said recesses and be clamped by the parts when connected and be engaged by said plug member, a larger recess provided in one of said parts, a disk valve having radial lugs, the outer ends of which slidably engage the walls of said larger recess, said plug member comprising a hollow cylindrical body having radial apertures near its inner end and a handle upon its outer end, and being adapted to be inserted in said socket member and move the valve in one direction.

WILLIAM CHARLES STEPHENS.

Witnesses:
JOHN JOLLY STEPHENS,
BEATRICE V. WHEATON.